(12) United States Patent
Garcia et al.

(10) Patent No.: US 10,539,117 B2
(45) Date of Patent: Jan. 21, 2020

(54) POWER PLANT CONTROLLER FOR GENERATING A POWER REFERENCE TO WIND TURBINE GENERATORS

(71) Applicant: VESTAS WIND SYSTEMS A/S, Aarhus N (DK)

(72) Inventors: Jorge Martinez Garcia, Aarhus N (DK); Rasmus Lærke, Viby J (DK); Henrik Møller, Egå (DK); Kouroush Nayebi, Ikast (DK); Rubin Panni, Singapore (SG); Chun Meng Heng, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 294 days.

(21) Appl. No.: 15/039,390

(22) PCT Filed: Nov. 7, 2014

(86) PCT No.: PCT/DK2014/050368
§ 371 (c)(1),
(2) Date: May 25, 2016

(87) PCT Pub. No.: WO2015/078474
PCT Pub. Date: Jun. 4, 2015

(65) Prior Publication Data
US 2017/0292498 A1  Oct. 12, 2017

(30) Foreign Application Priority Data

Nov. 28, 2013 (DK) .................. 2013 70725

(51) Int. Cl.
*F03D 7/02* (2006.01)
*F03D 7/04* (2006.01)
(Continued)

(52) U.S. Cl.
CPC ........... *F03D 7/0284* (2013.01); *F03D 7/047* (2013.01); *H02J 3/18* (2013.01); *H02J 3/386* (2013.01);
(Continued)

(58) Field of Classification Search
CPC ........ F03D 7/0284; F03D 7/047; F03D 7/042; H02J 3/18; H02J 3/386; H02J 13/0093;
(Continued)

(56) References Cited

U.S. PATENT DOCUMENTS 4,118,635 A * 10/1978 Barrett .................... F01D 17/24
290/40 R
9,496,717 B2 * 11/2016 Rasmussen ............... H02J 3/40
(Continued)

FOREIGN PATENT DOCUMENTS

CN    101977008 A    2/2011
CN    103138280 A    6/2013
(Continued)

OTHER PUBLICATIONS

Fortmann, J.; Wilch, M.; Koch, F.W. and Erlich, I., "A Novel Centralised Wind Farm Controller Utilising Voltage Control Capability of Wind Turbines", Jul. 2008, 16th PSCC, Glasgow, Scotland.*
(Continued)

*Primary Examiner* — Brian W Wathen
*Assistant Examiner* — Kelvin Booker
(74) *Attorney, Agent, or Firm* — Patterson + Sheridan, LLP

(57) ABSTRACT

The invention relates to a power plant controller for controlling wind turbine generators. More particularly, the invention relates to a method for compensating data obtained from measurements at a connection point to the grid in case of a communication failure where communication of such data is lost or becomes unreliable. The measured
(Continued)

data are used in the power plant controller for determining setpoints for controlling the wind turbine generators' production of active and reactive power. In response to detection of a communication fault a new setpoint is determined independently of new measured grid data by reconfiguring parts of the power plant controller.

14 Claims, 3 Drawing Sheets

(51) Int. Cl.
| | |
|---|---|
| H02J 3/16 | (2006.01) |
| H02J 3/18 | (2006.01) |
| G05B 23/02 | (2006.01) |
| H02J 3/38 | (2006.01) |
| H02J 13/00 | (2006.01) |

(52) U.S. Cl.
CPC .......... *H02J 13/0093* (2013.01); *F03D 7/042* (2013.01); *F05B 2270/1033* (2013.01); *F05B 2270/337* (2013.01); *H02J 3/38* (2013.01)

(58) Field of Classification Search
CPC ................ H02J 3/38; F05B 2270/1033; F05B 2270/337
See application file for complete search history.

(56) References Cited

U.S. PATENT DOCUMENTS

| | | | | |
|---|---|---|---|---|
| 9,631,608 | B2* | 4/2017 | Garcia | F03D 9/255 |
| 9,920,746 | B2* | 3/2018 | Diedrichs | F03D 7/048 |
| 10,103,661 | B2* | 10/2018 | Mayer | H02J 3/16 |
| 2008/0071427 | A1* | 3/2008 | Szepek | F02C 9/42 |
| | | | | 700/287 |
| 2009/0250931 | A1* | 10/2009 | Schubert | H02P 9/007 |
| | | | | 290/44 |
| 2010/0207463 | A1* | 8/2010 | Fortmann | H02J 3/1885 |
| | | | | 307/153 |
| 2010/0268849 | A1* | 10/2010 | Bengtson | G05B 15/02 |
| | | | | 709/248 |
| 2010/0312409 | A1 | 12/2010 | Zeumer et al. | |
| 2010/0332042 | A1 | 12/2010 | Riesberg et al. | |
| 2011/0057444 | A1* | 3/2011 | Dai | H02J 3/386 |
| | | | | 290/44 |
| 2011/0309683 | A1* | 12/2011 | Nielsen | F03D 7/0284 |
| | | | | 307/84 |
| 2012/0109390 | A1* | 5/2012 | Delong | H02J 3/06 |
| | | | | 700/287 |
| 2012/0290104 | A1* | 11/2012 | Holt | G06Q 10/00 |
| | | | | 700/29 |
| 2013/0054043 | A1* | 2/2013 | Klodowski | G01R 31/343 |
| | | | | 700/293 |
| 2013/0249215 | A1* | 9/2013 | Egedal | H02J 3/16 |
| | | | | 290/44 |
| 2013/0257051 | A1* | 10/2013 | Spruce | F03D 7/028 |
| | | | | 290/44 |
| 2013/0270827 | A1* | 10/2013 | Couchman | F03D 7/028 |
| | | | | 290/44 |
| 2013/0277970 | A1* | 10/2013 | Dange | F03D 7/026 |
| | | | | 290/44 |
| 2013/0346768 | A1* | 12/2013 | Forbes, Jr. | G06F 1/266 |
| | | | | 713/310 |
| 2014/0015250 | A1* | 1/2014 | Teodorescu | F03D 7/0284 |
| | | | | 290/44 |
| 2014/0060066 | A1* | 3/2014 | Hesse | F02C 7/232 |
| | | | | 60/773 |
| 2014/0103652 | A1* | 4/2014 | Ubben | F03D 7/028 |
| | | | | 290/44 |
| 2014/0103653 | A1* | 4/2014 | Ubben | F03D 7/028 |
| | | | | 290/44 |
| 2014/0217730 | A1* | 8/2014 | Styhm | H02P 3/22 |
| | | | | 290/44 |
| 2015/0092462 | A1* | 4/2015 | Ohori | H02M 7/44 |
| | | | | 363/71 |
| 2015/0112496 | A1* | 4/2015 | Fisher | H02J 3/16 |
| | | | | 700/291 |
| 2015/0137519 | A1* | 5/2015 | Tarnowski | F03D 7/0284 |
| | | | | 290/44 |
| 2015/0137520 | A1* | 5/2015 | Garcia | H02J 3/1885 |
| | | | | 290/44 |
| 2015/0198145 | A1* | 7/2015 | Diedrichs | F03D 7/04 |
| | | | | 700/287 |
| 2015/0236508 | A1* | 8/2015 | Divan | H02J 3/12 |
| | | | | 700/295 |
| 2015/0236509 | A1* | 8/2015 | Divan | H02J 3/16 |
| | | | | 700/298 |
| 2015/0280629 | A1* | 10/2015 | Diedrichs | H02J 3/24 |
| | | | | 290/44 |
| 2015/0300318 | A1* | 10/2015 | Mayer | F03D 7/0272 |
| | | | | 290/44 |
| 2015/0369217 | A1* | 12/2015 | Gupta | H02J 3/16 |
| | | | | 290/44 |
| 2016/0108890 | A1* | 4/2016 | Garcia | F03D 1/0666 |
| | | | | 700/287 |
| 2016/0248254 | A1* | 8/2016 | Huomo | H02J 13/0006 |
| 2016/0322821 | A1* | 11/2016 | Saboor | F03D 7/048 |
| 2016/0344191 | A1* | 11/2016 | Sivakumar | H02J 3/383 |
| 2017/0022977 | A1* | 1/2017 | Garcia | F03D 7/0284 |
| 2017/0025855 | A1* | 1/2017 | Garcia | H02J 3/16 |
| 2017/0025858 | A1* | 1/2017 | Garcia | H02J 3/386 |
| 2017/0025859 | A1* | 1/2017 | Garcia | H02J 3/16 |
| 2017/0250540 | A1* | 8/2017 | Varma | H02M 7/44 |
| 2018/0026443 | A1* | 1/2018 | Covic | H02J 3/381 |
| | | | | 307/31 |

FOREIGN PATENT DOCUMENTS

| | | |
|---|---|---|
| CN | 103296643 A | 9/2013 |
| EP | 2182207 A2 | 5/2010 |
| EP | 2599995 A1 | 6/2013 |
| EP | 2610487 A1 | 7/2013 |
| WO | 2010/086031 A2 | 8/2010 |
| WO | 2013/044922 A1 | 4/2013 |

OTHER PUBLICATIONS

Richard Yu F et al.: "Communication systems for grid integration of renewable energy resources", IEEE Network, IEEE Service Center, New York, NY, US, vol. 25, No. 5, Sep. 1, 2011, pp. 22-29.
Danish Search Report for PA 2012 70725, dated Jun. 11, 2014.
International Search Report for PCT/DK2014/050368, dated Mar. 19, 2015.
Chinese Office Action for Application No. 201480064909.1 dated Mar. 19, 2018.
Chinese Office Action for Application No. 201480064909.1 dated Oct. 17, 2017.

\* cited by examiner

POWER PLANT CONTROLLER FOR GENERATING A POWER REFERENCE TO WIND TURBINE GENERATORS

FIELD OF THE INVENTION

The invention relates to a method for controlling at least one wind turbine generator, particularly to controlling wind turbine generators to produce a desired amount of active or reactive power based on measured grid values. Further, the invention relates to a power plant controller, and to a wind power plant comprising a power plant controller.

BACKGROUND OF THE INVENTION

In a wind power plant (WPP) a number of wind turbine generators (WTGs) are connected to the grid at point of common connection. In order to ensure that the wind turbine generators deliver a power output which satisfies certain electrical requirements at the point of common connection the wind turbine generators are controlled on basis of references corresponding to the certain electrical requirements and measurements of electrical quantities present at the point of common connection.

The measured electrical quantities may be obtained by a grid meter connected to the point of common connection. The measured electrical quantities are communicated from the grid meter to a controller.

EP2610487 discloses a method for controlling a wind turbine connected to a utility grid where the method comprises: detecting whether control data from a central controller are receivable, wherein the central controller is provided for controlling the wind turbine and a plurality of other wind turbines; if it is detected that control data from the central controller are receivable, receiving the control data from the central controller; if it is detected that control data from the central controller are not receivable, receiving the control data from a local controller of the wind turbine; and controlling the wind turbine based on the received control data.

SUMMARY OF THE INVENTION

The inventors of the present invention have found that if the communication from the grid meter to the controller fails, it becomes difficult to control the wind turbine generators so that they produce a power output which satisfies the certain electrical requirements. Accordingly, it is problematic to control the wind turbine generators in case of a lost communication between the grid meter and the controller and, therefore an objective to find a solution which addresses such problems.

Due to this objective and problems of known solutions, the inventors of the present invention have appreciated that improvements would be of benefit, and has in consequence devised the present invention.

Accordingly, it would be advantageous to achieve improved methods for controlling wind turbine generators. In particular, it may be seen as an object of the present invention to provide a method that solves the above mentioned problems relating to communication faults in communication of measured input signals to a control system, or that solves other problems, of the prior art.

To better address one or more of these concerns, in a first aspect of the invention a power plant controller for generating a setpoint to one or more wind turbine generators connected to an electrical grid, wherein the setpoint relates to a desired amount of power to be produced at least in part by the one or more wind turbine generators is presented that comprises, a reference control system configured to receive a stream of electrical grid values from a grid meter and to receive an electrical reference value, wherein the reference control system is configured to determine the setpoint on the basis of the electrical reference value and the stream of electrical grid values, and wherein the power plant controller is configured to determine the electrical grid values based on values measured at a grid connection point, a fault detector configured to detect a communication fault in the communication of the electrical grid values, wherein the power plant controller, in response to a detection of the communication fault, is configured to reconfigure the reference control system so that the setpoint is determined independently of the stream of electrical grid values (104).

The grid connection point has a location sufficiently close to the grid so that measurements at the grid connection point at least approximate measurements at the grid. Accordingly, the grid connection point may be at a location where the wind power plant is connected to the grid, or a location not far from the grid. The grid may be any electrical power network.

Advantageously, by configuring the power plant controller so that the setpoint can be determined independently of the measured electrical grid values, by a reconfiguration of the control system, the power plant controller has an improved robustness to communication faults in the communication of measured grid quantities. By way of the improved robustness, the control of wind turbine generators is improved.

According to an embodiment, the power plant controller is configured to reconfigure the reference control system by replacing the electrical grid values with one or more alternative values According to an embodiment, the power plant controller is configured to receive the one or more alternative values from a backup grid meter.

According to an embodiment, the power plant controller is configured to determine the one or more alternative values on basis of one or more of the electrical grid values obtained before the detection of the communication fault.

Advantageously, by replacing the measured electrical grid values with historical values obtained before the communication fault an approximation to the actual grid values may be obtained.

According to another embodiment, the power plant controller is configured to determine the one or more alternative values on basis of one or more electrical output values measured from one or more power outputs of the one or more wind turbine generator.

Advantageously, electrical grid quantities such as frequency which are not highly affected by electrical reactances between the output of the wind turbine generators and the grid connection point may be replaced by corresponding quantities measured at the output of the wind turbine generators.

Accordingly, the electrical output values measured at the power output of the wind turbine generators, which could be used for replacing the electrical grid values may comprises one or more measured frequency values measured from the power output of one of the wind turbine generators, alternatively or additionally, a measured active power produced by the one or more wind turbine generators.

According to an embodiment, the power plant controller is configured to reconfigure the reference control system by determining the setpoint solely on basis of the electrical reference input.

Advantageously, instead of using measured values, a stream of measured electrical grid values may be approximated by the reference input to the control system. For example, the setpoint may be set equal to the electrical reference input.

Thus, in general the alternative values for replacing the stream of measured electrical grid values may be determined from input values already supplied to the reference control system, e.g. by determining the setpoint solely on basis of the electrical reference input or by determining the setpoint on basis of an historical measured electrical grid values obtained before the detection of the communication fault.

According to an embodiment the reference control system is configured for determining
- a first setpoint relating to a desired amount of reactive power on basis of a voltage or reactive reference value and a stream of measured voltage and/or reactive power values, and/or
- a second setpoint relating to a desired amount of active power on basis of a power or frequency reference value and a stream of measured frequency and/or power values.

According to an embodiment the power plant controller is configured to reconfigure the reference control system after a first time delay after detection of the communication fault.

According to an embodiment the power plant controller, in response to a detection of no communication fault, is configured to configure the reference control system back into an original state wherein the setpoint is determined dependent on the measured electrical grid values communicated by the grid meter.

In order to ensure that a reestablishment of the communication—in response to detection of no communication faults—is persistent, the power plant controller may be configured to configure the reference control system back into an original state after a second time delay, in response to a detection of no communication fault.

A second aspect of the invention relates to a wind power plant connectable to an electrical grid, wherein the wind power plant comprises at least one wind turbine generator, and a power plant controller as claimed in the first aspect.

A third aspect of the invention relates to a method for generating a setpoint to one or more wind turbine generators connected to an electrical grid via a connection line, where the method comprises
- determining the setpoint on basis of an electrical reference value and a stream of determined electrical grid values communicated to a reference control system from a grid meter, where the grid meter is connected to the connection line at a location which enables measurements of electrical quantities present at the grid, and wherein the electrical grid values are determined based on the electrical quantities present at the grid,
- detecting a communication fault in the communication of the electrical grid values, and
- in response to detecting the communication fault, reconfiguring the reference control system so that the setpoint is determined independently of the stream of electrical grid values.

A fourth aspect of the invention relates to at least one computer program product directly loadable into the internal memory of at least one digital computer, comprising software code portions for performing the steps of the third aspect when said at least one product is/are run on said at least one computer.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
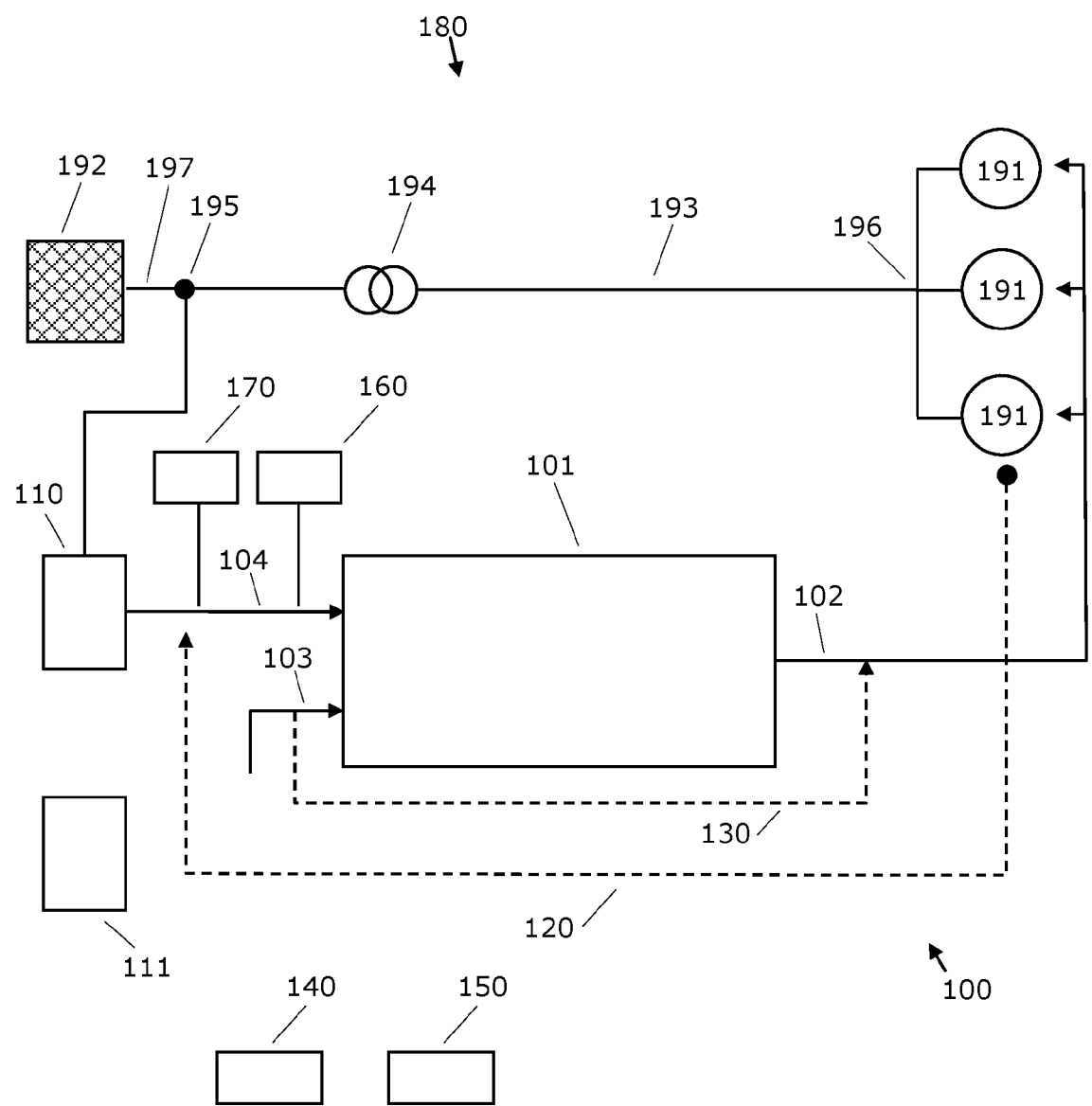
FIG. 1 illustrates a power plant controller 100.

FIG. 1 illustrates a wind power plant (WPP) 180 comprising a power plant controller (PPC) 100, one or more wind turbine generators (WTG) 191 and other components. The illustrated power plant controller 100 may only illustrate a part of a power plant controller 100 which could also include other components not illustrated here. Among different functions of the power plant controller, one function is for generating one or more setpoints to one or more wind turbine generators 191. The setpoints directly or indirectly sets a desired amount of active and/or reactive power to be produced by the wind turbine generator. The setpoint for reactive power may be in the form of a value of a reactive power Q, a voltage U or a quadrature current Iq, where these values are related by $Q=U \cdot Iq$. The setpoint for active power may be in the form of a value of an active power P, a voltage U or a current I, where these values are related by $Q=U \cdot I$. The one or more setpoints are supplied as input references to a control system of the wind turbine generators which is capable of controlling the wind turbine generator to generate an amount of reactive power corresponding to the setpoint. Accordingly, the wind turbine generators are responsive to change a parameter of produced power in response to a provided setpoint, i.e. to change the amount of active and/or reactive power injected to the electrical grid.

The functionality of the wind turbine generator to change the amount of reactive power supplied to the grid is embodied by a power inverter comprised by the wind turbine generator. Accordingly, the aforementioned control system of the wind turbine generator is configured for controlling the inverter's injection of active and/or reactive current to the grid in response to the setpoint.

One or more wind turbine generators (WTGs) 191 are connected to the grid 192 via a WTG connection point 196 and a power connection line 193. The electrical grid 192 may also be referred to as a grid or utility grid. One or more electrical transformers 194 may be located between the power output of the wind turbine generators 191 and the grid 192 for the purpose of adapting the voltage of the wind turbine's power output to the grid voltage. The power output of a wind turbine generator may include terminals from which electrical power can be supplied to the connection line 193 via an electrical connection. The one or more transformers 195 and possibly other electrical devices connected to the connection line 193 influences the impedance of the connection line with additional reactances.

The power plant controller comprises a reference control system 101 configured to receive a stream of electrical grid values from a grid meter 110 and to receive an electrical reference value. The reference control system is configured to determine the setpoint 102 on the basis of the electrical reference value 103 and the stream of electrical grid values 104. The power plant controller, e.g. the grid meter 110, is configured to determine the electrical grid values 104 based on values measured at a grid connection point 197, e.g. measured by a grid sensor 195.

Such grid sensor 195 measures different electrical parameters of electrical power supplied to the grid, e.g. voltage and current, at a point of measurement (POM). The POM may be equivalent to a grid connection point 197 (or point of common coupling PCC) where the power output from the final transformer 194 (and possibly other final transformers 194) is connected to the grid. The grid sensor generally consists of one or more voltage sensors and one or more current sensors which are located between the grid 192 and the grid transformer 194. The measured electrical parameters may further be processed by a grid meter 110. For example, the grid meter 110 may determine values of voltage, active and reactive power and frequency on basis of measured voltage and current signals supplied by the grid sensor 195. The values determined by the grid meter 110 are streamed to the reference control system 101 via a connection, e.g. a wired digital connection, as electrical grid values 104 which may be seen as measured electrical grid values since they are determined from other measured electrical grid quantities. Streaming means that recent measured values from the grid meter 110 are transmitted at a given sampling rate.

It is characteristic that the POM is located between the grid 192 and the one or more transformers 195 and other electrical devices affecting the impedance of the connection line with reactances. Accordingly, measurements at the POM reflect the electrical quantities present at the grid connection point 197.

The electrical reference value 103 contains reference values of electrical parameters which are desired to inject into the grid 192, e.g. references of voltage, active power, reactive power and/or frequency that should be present at the location of the grid meter 105. The electrical reference value(s) 103 may be provided either by a grid operator either a dispatcher centre or WPP operator.

Accordingly, the electrical reference value 103 and the electrical grid values 104 may comprise voltages, frequency values, active and reactive power values. Depending on the configuration of the reference control system 101, the setpoint may be determined on basis of one or more electrical reference values, e.g. voltage and reactive power references.

Examples of possible configurations of a reference control system 101 are provided later in the description.

Accordingly, in order to be able to control the amount of reactive and active power injected to the grid 192 it is important that reliable electrical grid values 104 reflecting the actual power parameters at the point of measurement are supplied to the reference control system 101.

However, situations may arise wherein the electrical grid values 104 become faulty or unreliable due to a communication failure in the connection 104 or in communication parts of the grid meter 110 or other systems.

For the purpose of detecting such communication faults, the power plant controller is configured with a fault detector 160 configured for detecting a communication fault in the communication of the measured electrical values from the grid meter 110.

Detection of a communication fault in a connection 104 may be performed using known error detection methods such as parity bit methods, check sum methods or other methods such as the known heart beat method for detection of a lost communication.

In order to avoid that the injected active and reactive power is controlled in an inappropriate way due to faulty electrical grid values 104, the power plant controller 100 may be configured to handle such detected communication faults in different ways.

In order address such communication faults, the power plant controller 100 may be configured to reconfigure the reference control system 101 so that the setpoint 102 is determined independently of values (e.g. corrupted values or incorrect measured values) communicated by/from the grid meter. Thus, the reference control system 101 is reconfigured so that the setpoints 102 are still determined and supplied to the wind turbine generators 191, but wherein the setpoints 102 are determined independently of the electrical grid values 104, e.g. by replacing the electrical grid values 104 with one or more alternative values from an alternative source. That is, the electrical grid values may be replaced by a single fixed alternative value or a stream of alternative values.

For example, the power plant controller 100 may be configured with a backup grid meter 111 which can be switched in and replace the main grid meter 110 in case of detection of a communication fault, so that the reference control system 101 can be provided with alternative electrical grid values 104 from the backup grid meter. The backup and main grid meters may be identical so that the electrical grid values 104 from the backup meter 111 are as accurate as if they were supplied by the main grid meter 110.

In another example, one or more alternative values are determined from one or more of the electrical grid values obtained before the detection of the communication fault. This functionality may be enabled by configuring the power plant controller 100 with a storage 170 which stores one or more of the latest electric grid values 104. The storage may sample values of an analog signal outputted by the grid meter 110, or simply store values of a digital signal. For example, the latest stored value or an average of a number of the latest store values obtained before the detection of the communication fault may be used as an alternative value replacing the stream of electrical grid values 104.

In another example the one or more alternative values are determined on basis of one or more electrical output values measured from one or more power outputs of one or more of the wind turbine generators 191. Accordingly, instead of determining the electrical grid values 104 from measurements from the grid sensor 195 alternative electrical grid values 104 may be determined from electrical parameters measured at the power output of one or more of the wind turbine generators 191. The function for replacement of electrical grid values 104 from the grid meter 110 by alternative electrical grid values based on measured values from the wind turbine generators 191 is indicated by reference sign 120.

The measured electrical output values from the wind turbine generators 191 may need to be processed by a processor (not shown) before a replacement with the electrical grid values 104 can take place. For example, voltage and current values measured at the power output of the wind turbine generators may be processed into values of frequency, active power and reactive power which can replace one or more of the original electrical grid values 104.

In an embodiment the one or more electrical output values comprises one or more measured frequency values measured from the power output of one of the wind turbine generators. Accordingly, such frequency values from the wind turbine generators 191 can replace frequency values obtained from the grid sensor 195.

Since the frequency of the electrical power signal at the power output of the one or more wind turbine generators can be assumed equal or substantially equal, it may be sufficient to measure the frequency at the power output of a single wind turbine generator. The frequency may be determined by conventional methods, e.g. by determining an average frequency of a sinusoidal voltage measured at the power output.

In a similar embodiment, the one or more electrical output values comprises a measured active power produced by the wind turbine generators. The measured active power may be determined as the sum of all active powers measured from the power output of all wind turbine generators connected to the WTG connection point 196. Such power values from the wind turbine generators 191 can replace similar power values obtained from the grid sensor 196.

The active power transmitted via the power output of a single wind turbine generator can be determined by conventional methods, e.g. by measuring the voltage U and current I amplitudes of the electrical power signal supplied by the power output and determining the power P from voltage and current amplitudes, e.g. as P=U·I. In order to find the total power produced by the wind turbine generators, the sum of powers P from each of the wind turbine generators can be determined.

Since the abovementioned frequency and power values measured at the power output of the wind turbine generators may provide a good estimate of the values at the point of measurement, i.e. at the location of the grid sensor 195, they may be used as alternative values.

In an alternative example of reconfiguring the reference control system 101, the setpoint 102 is determined solely on basis of the electrical reference input 103. For example, the setpoint 102 may be set equal to the electrical reference input 103 where the reference input could be an active or reactive power reference. This functionality is indicated by reference sign 130. Accordingly, the reference control system 101 is merely bypassed. When the setpoint 102 is determined solely on basis of the electrical reference input 103 the control algorithms of the reference control system 101 are stopped.

Figure 2:
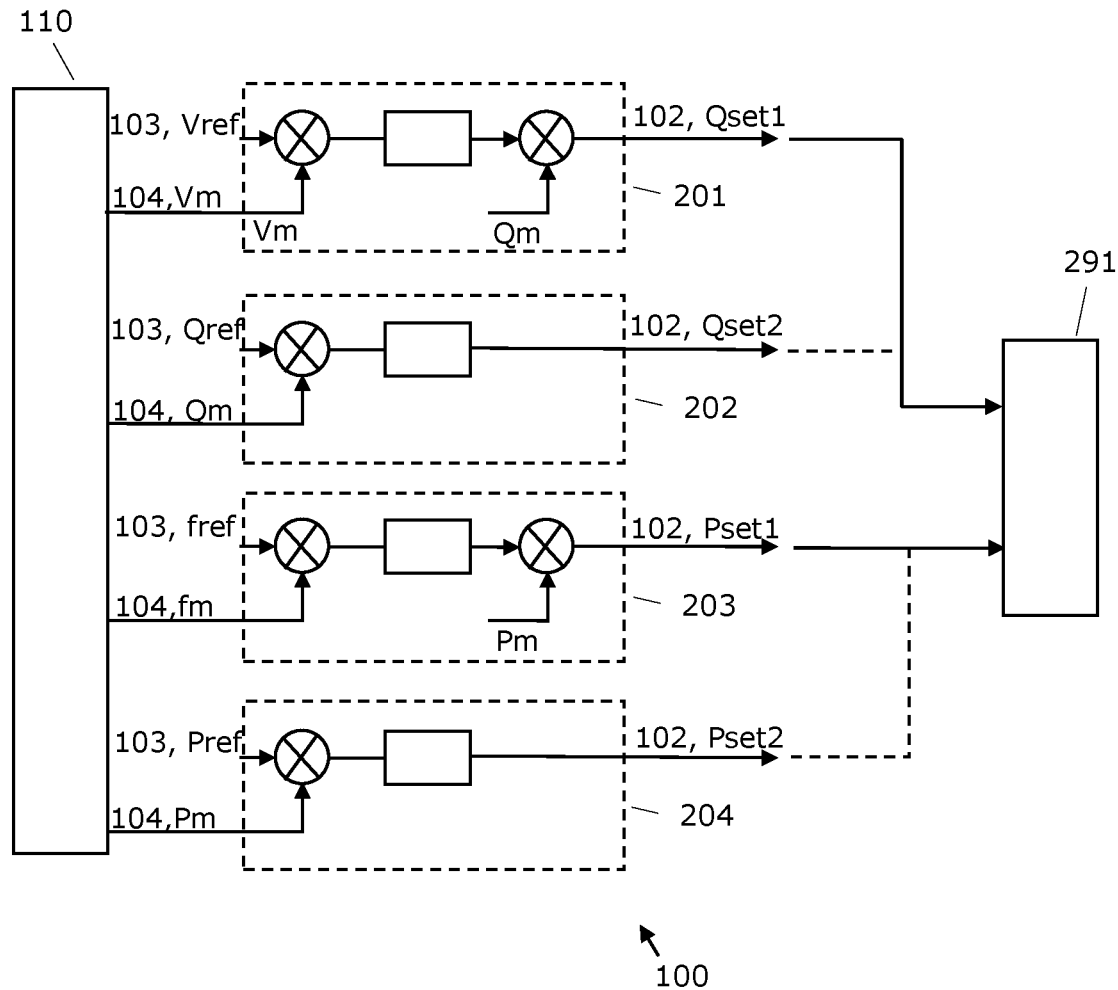
FIG. 2 illustrates details of the power plant controller 100 and reference control systems 201-204.

FIG. 2 illustrates further details of different embodiments described in connection with FIG. 1.

In FIG. 2, the power plant controller 100 is configured with reference control systems 201-204, where each of the systems 201-204 represent specific examples of the reference control system described in FIG. 1. The power plant controller 100 in FIG. 2 is configured so that either a first set of power setpoints Qset1 and Pset1 or a second set of power setpoints Qset2 and Pset2 are supplied to one or more wind turbine generators 291.

For convenience the fault detector 160 which supervises the Vm, Qm, fm and Pm outputs of the grid meter 110 is not shown in FIG. 2.

A reference control system 201 determines a reactive power setpoint 102,Qset1 on basis of a voltage reference value 103,Vref and a stream of measured voltages Vm and reactive powers Qm. Accordingly, the stream of measured electrical values 104 comprises a first stream of voltages Vm and a second stream of reactive powers Qm.

In case of detection of a communication fault, the control system 201 may be reconfigured by replacing Vm and Qm with alternative values from a backup grid meter 111 (not shown in FIG. 2), or with alternative values determined from one or more previously measured Vm and Qm values obtained before the detection of the communication fault.

A reference control system 202 determines a reactive power setpoint 102,Qset2 on basis of a reactive power reference value 103,Qref and a stream of measured reactive power values Qm.

In case of detection of a communication fault, the control system 202 may be reconfigured by replacing Qm with alternative values from a backup grid meter 111, or with alternative values determined from one or more previously measured Qm values obtained before the detection of the communication fault. Alternatively, the reference control system 202 may be reconfigured by determining the power setpoint Qset2 on basis of the electrical reference input Qref, e.g. by setting Qset2 equal to Qref.

A reference control system 203 determines an active power setpoint 102,Pset1 on basis of a frequency reference value 103,fref and a stream of measured frequencies fm and active powers Pm. Accordingly, the stream of measured electrical values 104 comprises a first stream of frequencies fm and a second stream of active powers Pm.

In case of detection of a communication fault, the control system 203 may be reconfigured by replacing fm and Pm with alternative values from a backup grid meter 111, or with alternative values determined from one or more previously measured fm and Pm values. Alternatively, the reference control system 203 may be reconfigured by replacing fm and Pm with alternative values determined from electrical output values measured from a power output of one or more of the wind turbine generators 291. Thus, fm and Pm may be replaced by one or more frequency and power values, respectively, measured from the output of from the wind turbine generators 291. For example, fm may be replaced by a single frequency value determined e.g. from an average of measured frequencies measured at one power output, or fm may be replaced by a stream of frequency values measured at one power output. Similarly, Pm may be replaced by a single power value determined as the sum of averaged power values of all output lines of the wind turbine generators 291, or by a stream of power values summer over the output lines of the wind turbine generators 291.

Finally, a reference control system 204 determines an active power setpoint 102, Pset2 on basis of an active power reference value 103,Pref and a stream of measured active powers Pm.

In case of detection of a communication fault the control system 204 may be reconfigured by replacing Pm with alternative values from a backup grid meter 111, or with alternative values determined from one or more previously measured Pm values. Further, the reference control system 204 may be reconfigured by replacing Pm with alternative values determined from electrical output values measured from the wind turbine generators 291 as described for control system 203. Alternatively, the reference control system 204 may be reconfigured by determining the power setpoint Pset2 on basis of the electrical reference input Pref, e.g. by setting Pset2 equal to Pref.

Accordingly, the possible ways to reconfigure the reference control systems 101, 201-204 in response to a communication fault depends on how the reference control systems are configured and which measured values are to be compensated.

Some grid parameters are not so much influenced by physical distance, e.g. grid frequency and active power, in which case other sources such as the power output of the wind turbine generators located a distance from the grid connection (at measurement point 195) can be used to provide the data. However, other quantities such as voltage and reactive power are highly influenced by location and, therefore, cannot be replaced by equivalent measurements at other locations, such as the power output of the wind turbine generators.

The electrical grid values 104 such as frequency, voltage, active power and reactive power represent electrical characteristics present at the grid connection point 197. Among these values, frequency and active power may be approximated by values measured at the power output of the wind turbine generators representing electrical characteristics present at the WTG connection point 196. In contrast voltage and reactive power values from the grid connection point 197 cannot be replaced by values measured at the power output of the wind turbine generators since these values may be affected due to transformers 194 and other devices having a reactance.

Thus, in general the reference control system may be configured for determining a reactive power setpoint Qset1, Qset2 on basis of a voltage reference Vref or reactive power reference Qref and a stream of measured voltages Vm and/or reactive power values Qm. Alternatively or additionally, the reference control system may be configured for determining an active power setpoint Pset1, Pset2 on basis of a power reference Pref or frequency reference fref and a stream of measured frequencies fm and/or active power values Pm.

The functionality of the power plant controller 100 for reconfiguring the reference control system 101 may be embodied by the power plant controller 100, e.g. by a reconfiguration unit 140 configured to replace the electrical grid values 104 with alternative values, to change how the setpoint 102 is computed and to perform other reconfigurations as described in connection with FIG. 1 and FIG. 2.

It may be beneficial to insert a delay between a first detection of a communication fault and starting a reconfiguration in order to avoid reconfigurations in cases where the communication fault is only present for a very short time. For that purpose the power plant controller is configured to reconfigure the reference control system after a time delay after detection of the communication fault. The time delay may be set by a timer 150 comprised by the power plant controller as shown in FIG. 1.

The power plant controller 100, or at least parts of the controller 100, such as the reference control systems 101 and other functions, such as the reconfiguration unit 140, may be implemented as a computer program running on a computer, as an electronic circuit or a combination thereof.

At some point in time when the communication fault is corrected, i.e. when no communication fault is detected anymore, the power plant controller is configured to configure the reference control system 101,201-204 back into an original state wherein the setpoint is determined dependent on values communicated from the grid meter. Thus, when the reference control system is configured back into its original state the functions of the controller are restarted—e.g. integral control functions—and the input of electrical grid values (104) from the grid meter are reintroduced. A time delay may be inserted between the time of detection of "no communication fault" and configuration of the control system 101 back into its original state.

Thus, a first time delay for deciding that communication is lost and second time delay for deciding that communication is re-established may be used. For example, assume that the communication fault is detected for a period of 2 ms. If the first time delay is 10 ms, no reconfiguration will be invoked. Only if the communication fault persists for more than 10 ms the reconfiguration of reference control system will be invoked. The same principle can applied when the communication is to be restored after detection of a healthy communication state after a non-healthy communication state.

Since the different reference control systems 201-204 are configured differently, different reconfiguration possibilities may be combined in the power plant controller 100. Also, depending on a given status of the power plant controller 100, some reconfiguration possibilities may be more suitable than others. Accordingly, different reconfiguration combinations may be applied depending on a given status of the power plant controller.

Figure 3:
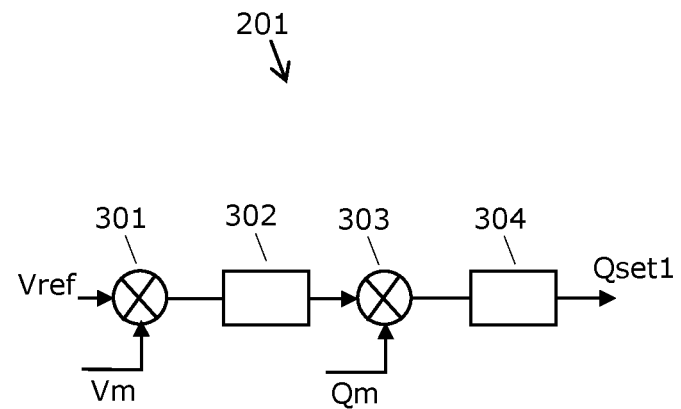
FIG. 3 illustrates details of a possible configuration of a reference control system 201.

FIG. 3 shows further details of a possible configuration of the reference control system 201. The reactive power setpoint Qset1 is determined from the measured grid voltage Vm and a grid reference voltage Vref. A difference of the voltage values Vm and Vref are determined by subtraction unit 301 and inputted to a PI controller 302. A difference of the output from PI controller 301 and the measured grid reactive power Qm is determined by subtraction unit 303 and inputted to PI controller 304. The output from PI controller 304 is the reactive power setpoint Qset1.

Such configurations of the reference controller 201 and similar configurations of the other reference controllers 202-204 are known. See e.g. section 4.2 and FIG. 8 in: "Operation and control of large wind turbines and wind farms—Final report; Florin by, Frede Blaabjerg, et. al.; Risø, September 2005, ISSN 0106-2840, ISBN 87-550-3469-1 (Internet)"

A method for generating a setpoint 102 to one or more wind turbine generators 191, 291 connected to an electrical grid 192 comprises one or more of the following steps, 1) determining the setpoint 102 on the basis of the electrical reference value 103 and the stream of electrical grid values 104 by use of the reference control system 101, 201-204,
2) detecting a communication fault in the communication of the electrical grid values by use of a fault detector 160,
3) in response to a detection of the communication fault, reconfiguring the reference control system by use of a reconfiguration functionality of the power plant controller, e.g. the a reconfiguration unit 140, so that the setpoint is determined independently of the stream of electrical grid values 104.

The power plant controller 100 or parts of the power plant controller such as the reference control system 101 and the communication fault detector 160, or parts of these units may be implemented as computer program products, as electric analogue or digital circuits, or as a combination thereof. A computer program being loadable into the internal memory of at least one digital computer is executable by the computer, wherein execution/running of the program results in functions of the power plant controller 100 being carried out, or in that the steps of a method of an embodiment of the invention are performed.

In summary the invention relates to a power plant controller for controlling wind turbine generators. More particularly, the invention relates to a method for compensating data obtained from measurements at a connection point to the grid in case of a communication failure where communication of such data is lost or becomes unreliable. The measured data are used in the power plant controller for determining setpoints for controlling the wind turbine generators' production of active and reactive power. In response to detection of a communication fault, a new setpoint is determined independently of new measured grid data by reconfiguring parts of the power plant controller.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A power plant controller for generating a setpoint to one or more wind turbine generators connected to an electrical grid, wherein the setpoint relates to a desired amount of power to be produced at least in part by the one or more wind turbine generators, wherein the power plant controller comprises:
   a reference control system configured to receive a stream of electrical grid values from a grid meter and to receive an electrical reference value, wherein the power plant controller is configured to determine the electrical grid values based on values measured at a grid connection point, and is configured to determine at least one of:
      a first setpoint (Qset1, Qset2) relating to a desired amount of reactive power on basis of a voltage and reactive power reference value (Vref, Qref) and a stream of measured voltage and reactive power values (Vm, Qm); and
      a second setpoint (Pset1, Pset2) relating to a desired amount of active power on basis of a power and frequency reference value (Pref, fref) and a stream of measured frequency and power values (fm, Pm);
   a fault detector configured to detect a communication fault in the communication of the electrical grid values, wherein when the fault detector does not detect the communication fault, the reference control system is configured to determine the setpoint on the basis of the electrical reference value and the stream of electrical grid values, and
   wherein the power plant controller is further configured to, when the fault detector detects the communication fault, reconfigure the reference control system to determine the setpoint independently of the stream of electrical grid values whose transmission is affected by the communication fault based on an alternative stream of values.

2. The power plant controller according to claim 1, further comprising a wind power plant connectable to an electrical grid, wherein the wind power plant comprises the one or more wind turbine generators.

3. The power plant controller according to claim 1, wherein the alternative stream of values include backup electrical grid values received from a backup grid meter.

4. The power plant controller according to claim 1, wherein the alternative stream of values includes historical electrical grid values obtained before the detection of the communication fault.

5. The power plant controller according to claim 1, wherein the alternative stream of values includes one or more electrical output values measured from one or more power outputs of the one or more wind turbine generator.

6. The power plant controller according to claim 1, wherein the alternative stream of values includes measured frequency values measured from a power output of one of the one or more wind turbine generators.

7. The power plant controller according to claim 1, wherein the alternative stream of values include a measured active power produced by the one or more wind turbine generators.

8. The power plant controller according to claim 1, wherein the power plant controller is configured to reconfigure the reference control system, when the fault detector detects the communication fault, by determining the setpoint solely on the basis of the electrical reference value.

9. The power plant controller according to claim 8, wherein the power plant controller is configured to determine the setpoint solely on the basis of the electrical reference value by setting the setpoint equal to the electrical reference value.

10. The power plant controller according to claim 1, wherein the power plant controller is configured to reconfigure the reference control system after a first time delay after detection of the communication fault.

11. The power plant controller according to claim 1, wherein, after reconfiguring the reference control system responsive to detecting the communication fault, in response to the fault detector no longer detecting the communication fault, the power plant controller is configured to reconfigure the reference control system to determine the setpoint dependent on the electrical grid values communicated from the grid meter.

12. The power plant controller according to claim 11, wherein the power plant controller is configured to reconfigure the reference control system after a second time delay following the fault detector no longer detecting the communication fault.

13. A method for generating a setpoint to one or more wind turbine generators connected to an electrical grid via a connection line, wherein the method comprises:
   determining the setpoint on basis of an electrical reference value and a stream of determined electrical grid values, the stream of determined electrical grid values communicated to a reference control system from a grid meter, wherein the grid meter is connected to the connection line at a location which enables measurements of electrical quantities present at the grid, and wherein the electrical grid values are determined based on the electrical quantities present at the grid, wherein the set point comprises at least one of:
      a first setpoint (Qset1, Qset2) relating to a desired amount of reactive power on basis of a voltage and reactive power reference value (Vref, Qref) and a stream of measured voltage and reactive power values (Vm, Qm); and
      a second setpoint (Pset1, Pset2) relating to a desired amount of active power on basis of a power and frequency reference value (Pref, fref) and a stream of measured frequency and power values (fm, Pm);

detecting a communication fault in the communication of the electrical grid values, and in response to detecting the communication fault, reconfiguring the reference control system so that the setpoint is determined independently of electrical grid values whose transmission is affected by the communication fault by selecting alternative values.

14. A computer program product comprising:

a non-transitory computer-readable storage medium having computer-readable program code embodied therewith, the computer-readable program code configured to perform an operation for generating a setpoint to one or more wind turbine generators when the computer-readable program code is executed using one or more computer processors, the one or more wind turbine generators connected to an electrical grid via a connection line, the operation comprising:

determining the setpoint on basis of an electrical reference value and a stream of determined electrical grid values, the stream of determined electrical grid values communicated to a reference control system from a grid meter, wherein the grid meter is connected to the connection line at a location which enables measurements of electrical quantities present at the grid, and wherein the electrical grid values are determined based on the electrical quantities present at the grid, wherein the set point comprises at least one of:

a first setpoint (Qset1, Qset2) relating to a desired amount of reactive power on basis of a voltage and reactive power reference value (Vref, Qref) and a stream of measured voltage and reactive power values (Vm, Qm); and a second setpoint (Pset1, Pset2) relating to a desired amount of active power on basis of a power and frequency reference value (Pref, fref) and a stream of measured frequency and power values (fm, Pm);

detecting a communication fault in the communication of the electrical grid values, and in response to detecting the communication fault, reconfiguring the reference control system so that the setpoint is determined independently of electrical grid values whose transmission is affected by the communication fault by selecting alternative values.

* * * * *